3,706,657
HYDRODESULFURIZATION OF CRUDE AND
RESIDUAL OILS AT REDUCED SPACE
VELOCITY
John A. Paraskos and Allen E. Somers, Pittsburgh, Pa.,
assignors to Gulf Research & Development Company,
Pittsburgh, Pa.
Filed Dec. 31, 1970, Ser. No. 103,198
Int. Cl. C10g 23/02
U.S. Cl. 208—216          18 Claims

ABSTRACT OF THE DISCLOSURE

A process for hydrodesulfurizing a crude oil or a residual oil comprises passing the oil and hydrogen over an HDS catalyst, with the HDS catalyst cycle being limited by the maximum temperature that the reactor metals can withstand at the process pressure. As the hydrodesulfurization proceeds, metals from the feed oil are deposited on the catalyst until maximum possible metals loading on the catalyst is reached. As the process proceeds, a continual temperature rise is required to achieve the required sulfur removal until the maximum or constraint temperature is reached. According to this invention, it has been found that by maintaining the space velocity at a sufficiently low value the catalyst experiences maximum metals loading before the constraint temperature is reached so that full catalyst life is utilized.

---

Figure 1:
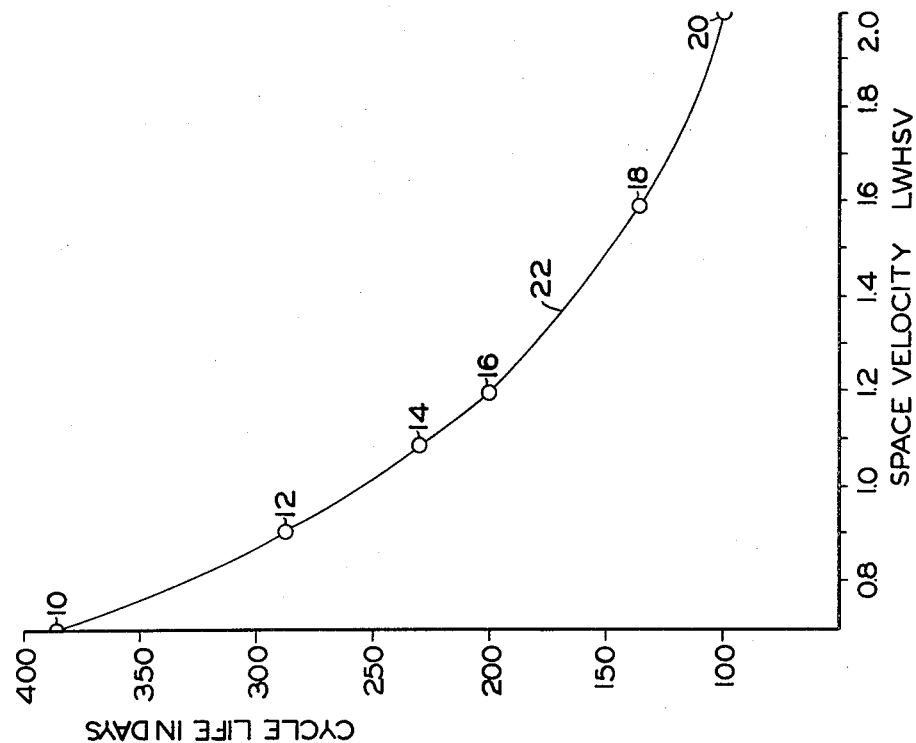

The present invention relates to a process for the hydrodesulfurization (HDS) of a crude oil or a reduced crude oil using an HDS catalyst. The HDS catalyst cycle is prolonged considerably in accordance with the present invention by operating at least a portion of the process cycle at a reduced space velocity. The catalyst is a supported Group VI and Group VIII metal hydrodesulfurization catalyst. Although not essential to the invention, the process advantageously utilizes an HDS catalyst having a small particle size.

Although nickel-cobalt-molybdenum is a preferred active metal combination for the HDS catalyst of the invention, other combinations can be utilized such as cobalt-molybdenum, nickel-tungsten, and nickel-molybdenum. Alumina is a preferred supporting material but other non-cracking supports can also be used. Suitable examples of such catalysts are disclosed in the copending coassigned application Ser. No. 770,625, filed Oct. 25, 1968, now U.S. Pat. No. 3,562,800.

In the hydrodesulfurization process a crude oil or a reduced or residual fraction is treated to reduce the sulfur content thereof to stipulated levels, for the purpose of minimizing air pollution and for other purposes. Crude or residual oils are difficult to desulfurize because they contain the heavier molecules in which is concentrated nearly the entire metals impurity of the oil. Ironically, sulfur removal does not deactivate the HDS catalyst as the sulfur is usually evolved as gaseous hydrogen sulfide. However, the metals impurity, which comprises primarily nickel and vanadium, does deactivate the catalyst because the metals are increasingly deposited on the active catalyst surfaces. Unfortunately the HDS catalyst has a greater activity for metals removal than for sulfur removal.

As the catalyst ages the operating temperature required to remove a given percentage of sulfur also increases. This increase in operating temperature results from the gradual reduction in active catalyst area owing to metals deposition. Eventually a point is reached where the requisite temperature is so high that the catalyst must be discarded. By way of background to the present invention, then, it is to be noted that the HDS catalyst has a predeterminable life cycle in the HDS process and that the life of the catalyst is determined not by the sulfur activity of the catalyst but rather by its metals content. The removed metals adhere permanently to the active catalyst surfaces, which usually precludes any regeneration of the catalyst. Thus, the catalyst material can be employed for one process cycle and thereafter must be discarded. The materials and labor costs in replacing the catalyst together with the attendant loss in production, therefore, must be balanced against the cost of enlarging the reaction vessel and associated apparatus entailed in carrying out the process.

There is, however, another consideration which limits the age of the catalyst cycle in conventional HDS processes, and this consideration assumes a more critical role as a result of discoveries underlying the invention. It is known that as the catalyst progressively absorbs metals from the crude or reduced oil, the temperature which must be maintained in the system for adequate sulfur removal must be increased. As is also known, the rate of temperature increase is more rapid near the beginning and end of the catalyst cycle, and less rapid at the intermediate stages. The rising rate of temperature increase near the end of the HDS cycle would appear to foreshorten the cycle life of the catalyst, but there are additional considerations as noted below.

Conventionally, the HDS process is carried out at rather high hydrogen partial pressures (approaching 2000 p.s.i.) in order to reduce somewhat the high initial temperatures that must be employed in the hydrodesulfurization of crude or reduced oil. Furthermore, during the process cycle an increased temperature rise is encountered, as noted above.

The high pressure requirement imparts a rigid upper temperature constraint in the HDS reactor. In a hydrogen-orientated process, hydrogen embrittlement of the metals from which the reactor is fabricated is likely to occur at these high pressures. Furthermore, as the reaction temperature increases with catalyst age to a particular level in the presence of high pressure hydrogen, dangerous fatigue strains are induced in the reactor metal. The temperature at which this fatigue effect becomes ominous will depend upon the quality and thickness of the steel or other structural metal used in the walls of the reaction vessel. In most commercial HDS reactors, this fatigue effect imposes a process temperature constraint of about 790° F.

Conventionally, the HDS process is initiated at the lowest possible temperature required to reduce the feed sulfur level to the desired effluent sulfur level. The space velocity of the reactants is maximized consistent with minimization of the reactor size and volume. The reactor temperature is gradually increased throughout the process cycle to compensate for catalyst aging owing to metals deposition, until the upper temperature constraint of about 790° F. is attained. Because of the aforementioned rising rate of temperature increase at this point, the catalyst has been considered heretofore to be deactivated at the reactor fatigue constraint temperature. The reactor, therefore, is shut down at this point, and the catalyst is discarded.

It is important to the present invention that the HDS catalyst is not in fact completely deactivated at the aforementioned constraint temperature, which has been established solely from a consideration of reactor metals fatigue and that some residual activity remains in the catalysts. This extendable catalyst life has been heretofore obscured by the aforementioned rising rate of temperature increase toward what is believed to have been the end of the catalyst cycle, and by the normal assumption that such rising rate harbingered a rapidly approaching, total deactivation of the catalyst.

It has now been found that at the metal fatigue temperature, much of the catalyst surface can still be free of metals depending on the space velocity and other processing variables so that the catalyst can still be capable of removing the same amount of sulfur from the feed if a higher temperature could be tolerated, or the catalyst could remove a smaller amount of sulfur than that prescribed for the process at the same temperature. However, in most cases the effluent sulfur level cannot be arbitrarily increased nor can the temperature at which the reactor metal fatigue becomes dangerous be disregarded.

The realization that the HDS catalyst is capable of extended life beyond that represented by the conventional HDS process cycle has led to two further findings. In further accordance with the present invention, it has been found that the life of the HDS catalyst increases inversely with space velocity. By the way of environmental explanation, it is assumed that an HDS process operating at a space velocity of 2.0 to reduce the sulfur level in a given feed from 4 percent to 1 percent reaches the assumed reaction constraint temperature of 790° F. after about three months, which would of course terminate the conventional HDS process cycle. Assuming now that all conditions remained the same in a comparative run, except that the space velocity is reduced to 1.0, it would naturally be anticipated that at half the space velocity the catalyst cycle life would be extended to be six months so that the same throughput of reaction products would be accommodated in both cases, before the reaction constraint temperature attains 790° F. However, due to the nonlinearities in this process the catalyst cycle in the second run has been found to be extended to considerably more than six months before the temperature constraint is reached, so that the total throughput in the second run is more than double that of the first run, for a given reactor size. This discovery has been masked heretofore by the commonly accepted and natural assumption that catalyst life is inversely but linearly proportional to space velocity, and by the assumption noted previously that catalyst life is virtually terminated at the constraint temperature of 790° F.

For the catalyst and feed system of the examples presented below, it has been found that in the case of a $\frac{1}{32}$ inch NiCoMo on alumina catalyst at a temperature of 790° F. the catalyst can contain 40 weight percent metals derived from the feed. (The same catalyst as $\frac{1}{16}$ inch extrudate would be fully loaded with metals derived from the feed at 20 weight percent loading at 790° F.) Full metals loading begins at the upstream end of a fixed catalyst bed and proceeds downstream. The catalyst is completely deactivated when the entire catalyst bed is fully loaded with the full quantity of metals it can hold at the constraint temperature.

Only when the entire catalyst bed is fully loaded with metals at or before the constraint temperature is reached has the process been successfully extended until full catalyst metal deactivation is achieved. In accordance with this invention, it has been discovered that by operating at sufficiently low space velocities the entire catalyst bed can achieve full metals loading at or before reaching the temperature constraint of the process. In this manner, the space velocity is no more than its highest value to achieve full metals deactivation of the catalyst prior to process shut-down.

To take advantage of the discovery of increased total throughput at a lower space velocity before the catalyst must be discarded, it is evident that a larger reactor capacity would be required to maintain a given production rate. However, the size of the reactor need not be doubled in the hypothetical case mentioned above for the reasons mentioned above and for the additional reason that the catalyst would have to be discarded less often. This would occasion an increase in production by this fact alone.

In another embodiment, the novel HDS process is carried out in a reactor of the same capacity as in conventional processes but with a considerably larger total throughput, or conversely in a reactor of smaller capacity with the same total throughput. It has been found in accordance with this feature of the invention, that the HDS catalyst can be subjected to the reactants at normal pressures and temperatures and also at a normal or commercially accepted space velocity. Thereafter, the space velocity can be reduced, in accordance with the invention, which also reduces the temperature necessary to maintain a given sulfur level in the effluent oil. As a corollary, the life of the HDS catalyst is extended until the process constraint temperature is again attained. Thereafter, the space velocity of the reactants can again be stepped down for one or more additional extensions or stages of catalyst life, without exceeding the reaction constraint temperature. Instead of discrete steps, the space velocity can be continuously reduced after the constraint temperature is attained. Thus, the first step or stage in the reaction cycle can be essentially similar to the complete HDS process as carried out heretofore. A result of the invention is, therefore, the same throughput or production in only the first stage of the process according to the invention. The total production or throughput achieved by the present invention surpasses that of conventional HDS processes by a marked degree.

The work of others in this field has been considered. For example, the United States Patent to Anderson, Jr. et al. No. 2,890,162 discloses that silica-containing catalysts show a high activity at low feed rates in a desulfurization process but that their effectiveness decreases rapidly with increased feed rate. However, the reference is discussing in this connection the effects of an undesired impurity; viz. silica, in the alumina support of the catalyst. Moreover, there is no appreciation in the reference of the discovery of the present invention that the decrease in feed rate produces a greater total throughput at the same effluent sulfur level or that the variation in feed rate or space velocity with catalyst life is non-linear.

Similar considerations are applicable to the disclosure of the United States Patent to Kay et al. No. 3,365,385. Although the latter reference teaches hydrorefining operations at a reduced space velocity, compensation is attained by increasing the residence time of the liquid phase in the catalyst bed. Again, there is no disclosure of a greater total throughput in an HDS process at reduced space velocity.

The hydrodesulfurization process of this invention can employ conventional reaction conditions such as, for example, a hydrogen partial pressure of 1000 to 5000 pounds per square inch generally, 1000 to 3000 p.s.i. preferably, and 1500 to 2500 p.s.i. more preferably. In a particular case a hydrogen pressure of 1750 to 1850 p.s.i. can be employed. Reactor design limitations usually restrict inlet pressures to not more than 2000, 2500, or 3000 p.s.i. It is the partial pressure of hydrogen rather than total reactor pressure which determines hydrodesulfurization activity. Preferably, then, the hydrogen stream is as free of other gases as possible. By the same token, the hydrogen pressure drop across the reactor should be minimized, preferably not greater than about 100 p.s.i.

The gas circulation rate can be between about 2000 and 20,000 standard cubic feet per barrel of feed oil generally, or preferably about 3000 to 10,000 s.c.f. per barrel. The gas should contain 85 percent or more of hydrogen. The mol ratio of hydrogen to oil can be between about 8:1 and 80:1. Reactor temperatures can range between about 650 and about 790° F., generally, and between about 680 and 790° F., preferably. At temperatures approaching 800° F., the steel of the reactor walls rapidly loses strength, as noted previously, and unless reactor wall thicknesses of 7 to 10 inches or more are utilized a temperature of about 790° F. constitutes a process constraint. The liquid weight hourly space velocity can be between about 0.2 and 20 generally, between about 0.4 and 10.0 preferably or between about 0.7 and 2.0 more preferably.

The catalyst employed in the process is conventional in composition and comprises sulfided Group VI and Group VIII metals on a suitable support as noted above. Hydrodesulfurization catalyst compositions suitable for use in the present invention are described in United States Patent Numbers 2,880,171 and 3,383,301. Although the process of the invention is essentially independent of catalyst particle size, according to the present understanding of the invention, the process is preferably carried out with a catalyst having particles considerably smaller than the diameter of the HDS catalyst particles of the prior art, as described in the aforementioned copending application Ser. No. 770,625, filed Oct. 25, 1968, now U.S. Patent No. 3,562,800. Accordingly, the diameter of the catalyst particles desirably is between about 1/20 and 1/40 inch, preferably between about 1/25 and 1/36 inch, and more preferably between about 1/29 and 1/34 inch. The catalyst can be prepared so that nearly all, i.e. at least about 92 or 96 percent, of the particles are within the desired range of the invention.

EXAMPLE I

A number of actual and simulation tests were conducted, the surprising results of which are graphically illustrated in FIGS. 1–4 of the drawings. A 50 percent reduced Kuwait crude containing four weight percent sulfur and 72 p.p.m. of total metals, primarily nickel and vanadium, was hydrodesulfurized to a product containing 1 percent sulfur by weight. A NiCoMo on 1/32 inch alumina particles was employed as the HDS catalyst. The catalyst contained 0.6 weight percent nickel, 1.1 weight percent cobalt and 7.9 weight percent molybdenum.

The inspections of the charge material are given in the following table:

TABLE I

| | Charge |
|---|---|
| Gravity, ASTM D287: API | 15.7 |
| Viscosity, SUV: SEC.: | |
| 100° F. | 4906 |
| 210° F. | 171.8 |
| Carbon, wt. percent | 84.52 |
| Hydrogen, wt. percent | 11.43 |
| Nitrogen, total, wt. percent | 0.20 |
| Sulfur, wt. percent | 4.06 |
| Carbon residue, RAMS: wt. percent ASTM 0524 | 8.16 |
| Metals, p.p.m.: | |
| Nickel | 17.0 |
| Vanadium | 54.0 |
| Distillation, ASTM D1160: ° F. corrected to 760 mm. Hg: | |
| 5 percent | 608 |
| 10 percent | 674 |
| 20 percent | 762 |
| 30 percent | 829 |
| 40 percent | 888 |

In these runs, an equipment limitation of 790° F. maximum average catalyst temperature was imposed, and, when this temperature was reached during the catalyst cycle, the catalyst was considered to be spent and the run was terminated.

The product inspections for several runs are given in the following table:

TABLE II

| Run | 1 | 2 | 3 | 4 | 5 |
|---|---|---|---|---|---|
| Gravity, ASTM D287: API | 20.7 | 20.7 | 20.7 | 20.8 | 20.8 |
| Viscosity, SUV: sec.: | | | | | |
| 100 F | 2,076 | 1,745 | 1,725 | 1,770 | 1,545 |
| 210 F | 113.0 | 106.8 | 104.7 | 100.9 | 99.1 |
| Carbon, wt. percent | 85.62 | 86.10 | 86.70 | 86.43 | 86.58 |
| Hydrogen, wt. percent | 12.00 | 12.03 | 11.83 | 12.23 | 11.92 |
| Nitrogen, total, wt. percent | 0.17 | 0.18 | 0.18 | 0.18 | 0.18 |
| Sulfur, wt. percent | 1.11 | 1.05 | 1.11 | 1.06 | 0.98 |
| Carbon residue, RAMS: wt. percent, ASTM D524 | 5.17 | 5.15 | 5.07 | 4.90 | 4.77 |
| Metals, p.p.m.: | | | | | |
| Nickel | 5.0 | 5.1 | 5.1 | 4.5 | 4.0 |
| Vanadium | 7.4 | 6.9 | 7.2 | 6.9 | 6.9 |
| Heat of combustion, D240: G, B.t.u./lb | 19,021 | 19,053 | 19,030 | 19,040 | 19,062 |
| Distillation, ASTM D1160: ° F., corrected to 760 mm. Hg.: | | | | | |
| 5 percent | 651 | 646 | 632 | 634 | 641 |
| 10 percent | 687 | 681 | 669 | 669 | 693 |
| 20 percent | 755 | 751 | 747 | 734 | 749 |
| 30 percent | 812 | 797 | 802 | 786 | 810 |
| 40 percent | 866 | 855 | 858 | 843 | 866 |
| 50 percent | 930 | 917 | 917 | 917 | 933 |
| 60 percent | 1,000 | 1,000 | 987 | 989 | 987 |

The graphically displayed data of FIG. 1 have been calculated from values of weight space velocity, catalyst age and throughput to obtain the values shown in FIG. 1 for maximum pounds of charge desulfurized to a 1 percent sulfur content per pound of catalyst. These maximum throughputs are plotted versus liquid weight hourly space velocity.

FIG. 1 shows that total throughput of oil desulfurized from 4 percent to 1 percent sulfur varies inversely with liquid weight hourly space velocity. Referring specifically to FIG. 1 of the drawings, it would be entirely expected that the total feed throughput before termination of the catalyst life cycle would be independent of space velocity, as represented by dashed horizontal line B. Thus, assuming an HDS process operating with a weight space velocity 2.0 (point C, FIG. 1), it would be expected that, if the space velocity were cut in half (point D), that the catalyst life would be doubled such that the throughput, as represented by dashed horizontal line B, would remain the same. In contrast, the throughput increases along curve A to point D' indicating that the oil throughput is unexpectedly more than doubled when the space velocity is halved.

The dashed vertical line E of FIG. 1 represents the unexpected increase in total throughput of the HDS system, in accordance with the invention.

In point of fact the FIG. 1 graph and the calculations from which FIG. 1 was prepared show that the maximum throughput increases from 4,630 pounds of processed oil per pound of catalyst at a space velocity of 2.0 to 6,520 pounds of processed oil per pound of catalyst at a space velocity of 0.7 (point F, FIG. 1), an increase of 41 percent. The surprising result illustrated in FIG. 1 is the increase in total throughput of the system with reduction in space velocity. Thus, the throughput increases, at a very nearly linear slope, with decrease in liquid weight hourly space velocity (LWHSV).

Figure 2:
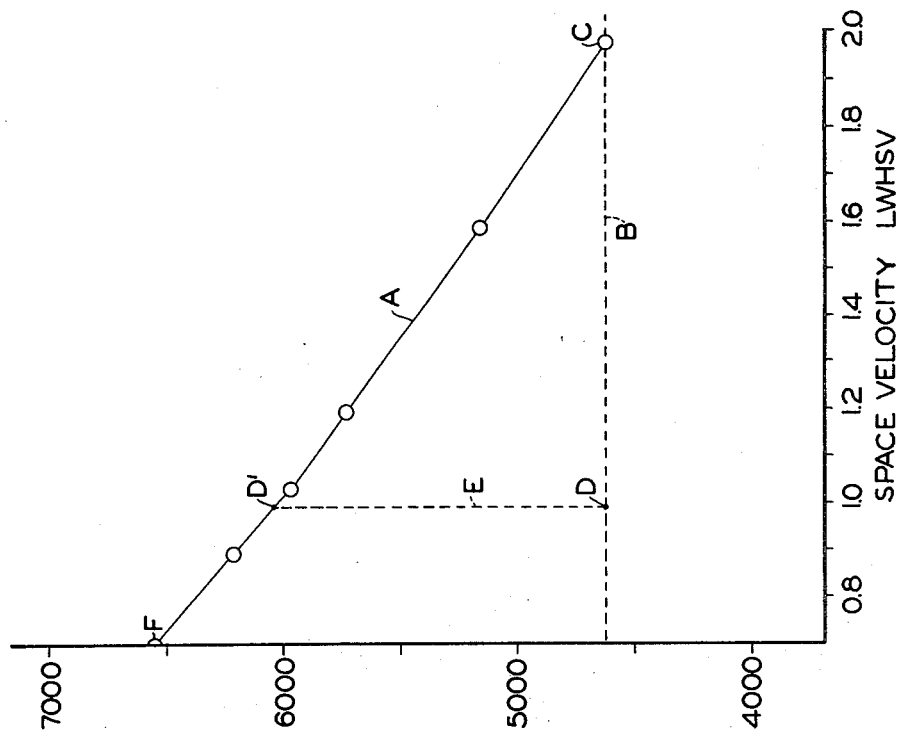
Figure 3:
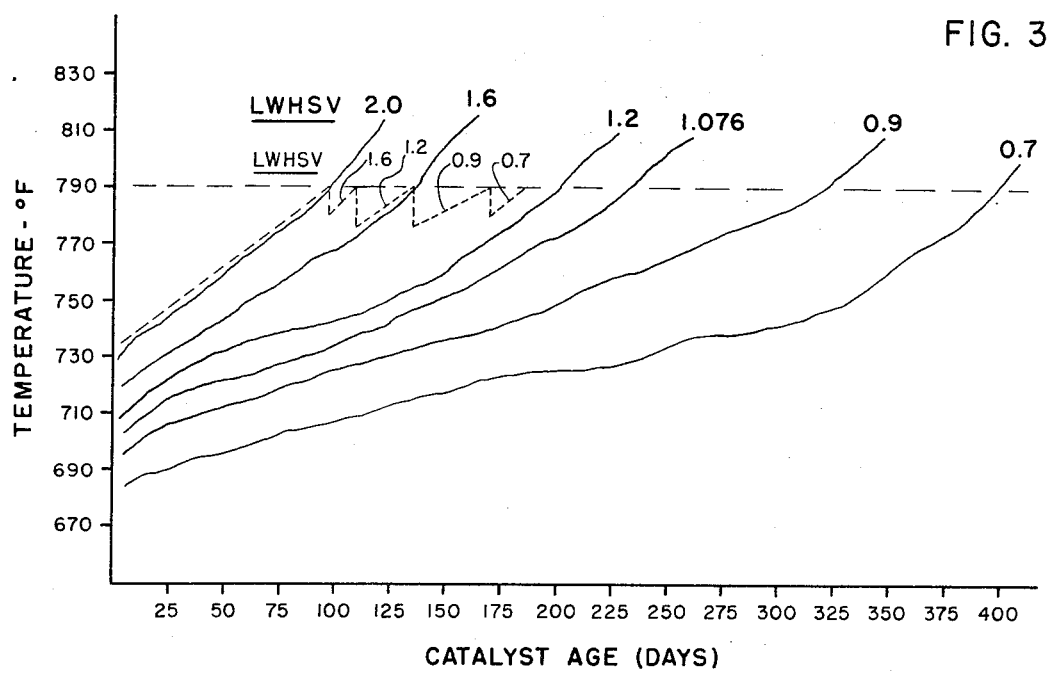

The hitherto unexpected and unforeseeable extensions of catalyst life made possible by the invention are evident from FIGS. 2 and 3 of the drawings. These figures show that the effect of space velocity upon catalyst cycle life is not a simple mathematical relationship. For example, merely reducing the space velocity from say 2.0 to 1.0 does not double the cycle life as would be anticipated. However, it has been discovered in accordance with the invention that the relationship between space velocity and cycle life is non-linear, as will be discussed in detail below.

EXAMPLE II

The data for FIGS. 2 and 3 were obtained from calculations and simulations involving a kinetic model obtained from the following table.

TABLE III

| Run No. | Catalyst age (days) | LWHSV | Weighted ave. reactor temp.(° F.) | Normalized concentration of— Sulfur in effluent, percent | Metals in effluent, percent |
|---|---|---|---|---|---|
| 1 | 10.7 | 1.076 | 799.5 | 27.4 | 17.75 |
| 2 | 20.7 | 1.10 | 705.8 | 25.9 | 17.19 |
| 3 | 27.0 | 1.08 | 710.8 | 27.4 | 17.6 |
| 4 | 39.7 | 1.06 | 716.5 | 26.1 | 16.3 |
| 5 | 62.7 | 1.06 | 726.5 | 24.2 | 15.6 |
| 6 | 102.8 | 1.24 | 748.0 | 25.8 | 19.20 |
| 7 | 122.8 | 1.28 | 748.0 | 27.1 | 20.30 |
| 8 | 161.0 | 1.29 | 756.0 | 28.4 | 24.50 |
| 9 | 184.0 | 1.28 | 761.5 | 28.0 | 23.60 |
| 10 | 215.0 | 1.29 | 769.5 | 27.7 | 21.10 |

From the foregoing data runs at space velocities of 0.7, 0.9, 1.2, 1.6 and 2.0 were simulated in addition to an actual run at 1.076 weight hourly space velocity (corresponding to 0.88 LHSV) mentioned above. These runs are denoted respectively by points 10–20 of FIG. 2 and by FIG. 3.

FIG. 2 demonstrates the non-linear and therefore unexpected character of the increase in cycle life of the catalyst with decrease in liquid space velocity. Heretofore, it was considered that the effect of changing space velocity on catalyst life would be entirely linear and therefore expected. It has now been established, in accord with the present invention, that a change in space velocity, for example, in the area between 1.8 and 2.0 LWHSV does not have nearly as great an effect upon catalyst cycle life as a change in space velocity in the area of, say, between 0.7 and 0.9. Thus, the advantages of the present invention are not only unforeseen, owing to the non-linear character of the curve 22 of FIG. 2, but in addition are magnified at the lower space velocities.

The effect of variable space velocities upon both catalyst life and reaction temperatures are evident from FIG. 3. The six space velocity curves correspond respectively with points 10–20 of FIG. 2 and to space velocities of 0.7, 0.9, 1.076, 1.2, 1.6, and 2.0. With the exception of the 1.076 space velocity curve, as noted previously, the curves of FIG. 3 have been obtained by simulations from the aforementioned kinetic model. As in the case of FIG. 2 the process conditions for the HDS processes of FIG. 3 are substantially as outlined earlier.

FIG. 3 illustrates more pointedly the considerable increase in useful catalyst life with decreasing space velocity, For example, assuming that the process constraint temperature is determined at 790° F., as noted previously, the catalyst has a useful process life of about 92 days when the liquid space velocity is 2.0 in contrast to a useful life of about 395 days when the space velocity is reduced to 0.7. Surprisingly, the life of the catalyst is increased almost 4 and ⅓ times rather than the expected not quite 3 times as a result of a lesser rate of feed flow. The curves representing 0.9 and 1.076 are particularly significant in their illustration of the considerable extension of catalyst cycle life, i.e. 100 days with a relatively minor decrease in space velocity.

As in the case of FIG. 1 it is assumed at each space velocity that the crude or reduced crude oil charge has a sulfur content of 4 percent, while the effluent product has a sulfur content of 1 percent. To ensure a proper comparison of the catalyst conditions at the differing space velocities, the useful life of the catalyst for each space velocity is considered ended when the process constraint temperature of 790° F. is reached. On the other hand, each of the runs is commenced at that initial temperature which is essential, in view of the space velocity, to ensure a 1 percent sulfur effluent. Thus, the temperature at the beginning of the run for the 1.6 S.V. curve is about 716° F. while the temperature at the beginning of the run for the 0.9 S.V. curve is about 690° F. This reduction in temperature at lower space velocities represents a further advantage of the HDS process of the invention.

In the design of a particular HDS plant, a balance must be achieved between space velocity of the liquid effluent and the size of the reactor vessel. While operating efficiency increases in accordance with the invention with decreasing space velocity, as evident from FIGS. 1–3, the size of the reactor also increases, which increases the initial cost of the reactor. To a very significant extent, the cost of increasing the capacity and also the wall thickness of the reactor vessel is balanced not only by the non-linear extension of the catalyst cycle life but also by the increase in productivity resulting from operating time saved with less frequent catalyst changes. A minimal overall cost must, therefore, be determined by balancing the initial cost of the reactor against the increased efficiency of the process with an increased reactor size. In many cases, however, a conventionally sized reactor can be retained and justified by savings in production resulting solely from less frequent catalyst changes at reduced space velocity.

Moreover, the size of the reactor can be minimized still further in accordance with another feature of the invention, which is also illustrated in FIG. 3. In FIG. 3 the average catalyst temperature in degrees Fahrenheit is plotted against catalyst age in days. The solid curves are representative of increasing space velocities. A process according to this feature of the invention is set forth in the following example.

EXAMPLE III

A series of tests were run to determine the effect of a step-wise reduction or series of reductions in space velocity upon the total throughput liquid and catalyst life. The reactor conditions are those enumerated previously herein, and the various charge and product inspections, and run data were employed as a basis for the tests of this example.

As a first stage of the process according to this feature of the invention the 50 percent reduced Kuwait crude was used as a charge to a reactor unit containing a catalyst charge as described above. The feed was charged at an initial average catalyst temperature of about 730° F. and a commonly accepted space velocity of 2.0 LWHSV. As a first stage in the process according to this feature of the invention (illustrated by the broken-line curves of FIG. 3); the average catalyst temperature was permitted to rise along the curve representing a commonly used space velocity of HDS processes of 2.0. In the process of the invention, as presently considered, a constraint temperature of 790° F. is imposed as outlined previously. This temperature limitation is sufficient to prevent damage to reactor walls and to avert personnel hazard, from high-temperature hydrogen embrittlement and high temperature weakening of the equipment.

The HDS process of this example, then, commences at 790° F. and 2.0 S.V. At this point, the space velocity of the liquid throughput is reduced and the average catalyst temperature is permitted to drop to about 780° F. as denoted by the broken-line curve.

During the ensuing second stage of the HDS process, hydrodesulfurization continues at a lower throughput liquid space velocity, for example at 1.6 LWHSV. (The solid line for 1.6 space velocity is not achieved in the catalyst of the present example because the catalyst of this example has been previously used at 2.0 S.V.) When the constraint temperature again is reached at 790° F., the HDS process again is interrupted preparatory to commencing a third stage. In the illustrated example the third stage is initiated by decreasing the space velocity still further, for example to 1.2 LWHSV, and permitting the average catalyst temperature to drop to about 777° F. From 777° F. the HDS reaction continues along a 1.2 S.V. curve until the temperature constraint is again attained. Additional steps along 0.9 and 0.7 S.V. curves are indicated by additional broken-line curves in FIG. 3. It is seen from FIG. 3 that the cycle length of the combined lower space velocity steps can be equal or greater than the cycle length at the initial space velocity.

It will be apparent that instead of discrete steps, the space velocity can be continuously decreased upon attaining the constraint temperature until it is uneconomical to continue the process further.

As described above two or more of the stages illustrated in FIG. 3 can be employed for the stepped HDS process of the invention. Of particular moment is the fact that the entire production or throughput of which conventional HDS processes are capable is obtained in only the first stage of the novel stepped HDS process. Owing to the discovery of the invention that the catalyst is not completely deactivated at the process contraint temperature, the space velocity and attendant temperatures can be stepped down as illustrated in FIG. 3 until a space velocity is attained at which the process becomes unremunerative. In carrying out the process of the invention it should be pointed out that it is not necessary that the particular space velocity decrements or curves illustrated in FIG. 3 be utilized. Thus, the process can start with a space velocity in excess of 2.0 and can terminate with a space velocity less than 0.7, or at space velocities therebetween. A usable range of space velocities extends from about 0.2 to about 20.0.

EXAMPLE IV

Figure 4:
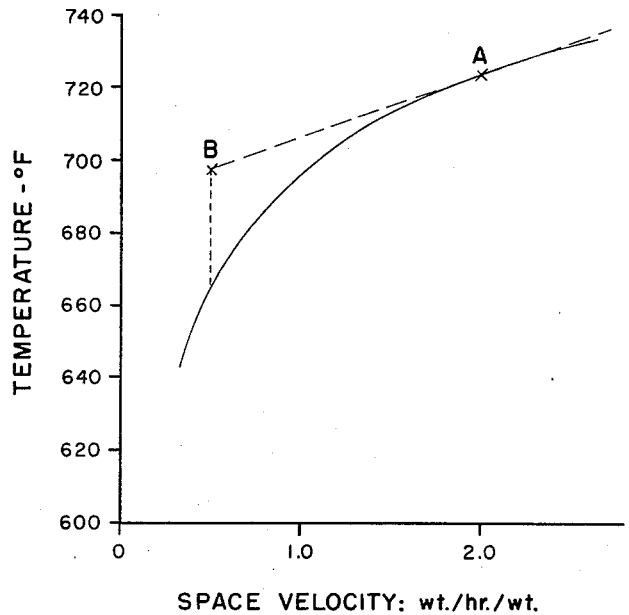

FIG. 4 will further illustrate the present invention. FIG. 4 is based upon initial catalyst activity and shows the temperature-space velocity relationship to reduce 4 percent sulfur Kuwait reduced crude to 1 percent sulfur effluent. At point A of FIG. 4 the space velocity is 2.0 and a temperature of 724° F. is required to obtain 1 percent sulfur. If the space velocity-temperature relationship were linear and the space velocity were reduced to 0.5, a temperature of 698° F. would be required to produce a 1 percent sulfur effluent. At a constraint temperature of 790° F., this would give a 790−698=92° F. temperature differential over which to operate before the constraint temperature were reached. However, the relationship is not linear, but is exponential, so that at the lower space velocity a temperature of only 664° F. is necessary, giving a temperature differential of 790−664=126° F. over which to operate. This permits longer catalyst life, in spite of the fact that at lower temperatures relatively more metals are deposited compared to sulfur removal.

It will be apparent that the present invention can be applied to other processes having a constraint temperature and in which a fixed catalyst bed tends to become coated with a solid material. Processes wherein solid coating of the catalyst occurs include hydrocracking and reforming in which coke deposits on the catalyst. Also, in the hydrogenation of benzene to cyclohexane with a supported nickel catalyst, sulfur deposits on the catalyst.

We claim:

1. A process for hydrodesulfurizing a sulfur- and metal-containing crude oil or residual oil comprising passing said oil and hydrogen over a bed or Group VI and Group VII metal hydrodesulfurization catalyst, metals from said oil tending to deposit on said catalyst until said catalyst reaches full metals-loading, the catalyst cycle being limited by a maximum process constraint temperature, operating said process at a space velocity which is sufficiently low that the catalyst bed reaches substantially full metals-loading about the time that the process temperature reaches said constraint temperature, whereby full catalyst life and maximum throughput can be attained.

2. The process of claim 1 including a hydrogen partial pressure of at least 1000 p.s.i.

3. The process of claim 1 wherein the hydrogen partial pressure is within the range of 1500 to 2500 p.s.i.

4. The process of claim 1 wherein the particles of said catalyst bed are between about 1/20 and 1/40 inch.

5. The process of claim 4 wherein the catalyst particle size is about 1/32 inch.

6. The process of claim 1 wherein the constraint temperature is about 790° F.

7. The process of claim 1 wherein the catalyst contains about 40 weight percent of deposited metals at full metals-loading.

8. The process of claim 1 wherein the catalyst contains about 20 weight percent of deposited metals at full metals-loading.

9. A process of hydrodesulfurizing a crude oil or a residual oil comprising passing said oil and hydrogen over a bed of Group VI and Group VIII metal hydrodesulfurization catalyst, the catalyst cycle being limited by a maximum process constraint temperature, operating said process until the process temperature reaches said maximum temperature, thereafter reducing the space velocity of said oil through said catalyst to an extent that the process temperature drops from said maximum temperature to permit continuation of said process at a lower temperature and space velocity whereby the cycle life of said catalyst and total throughput of said process are increased without exceeding said maximum temperature.

10. The process according to claim 9 including a hydrogen partial pressure of at least 1000 p.s.i.

11. The method according to claim 9 wherein the hydrogen partial pressure is within the range of 1500 p.s.i. to about 2500 p.s.i.

12. The process according to claim 9 wherein the particles of said catalyst bed are between about 1/20 and 1/40 inch.

13. The process according to claim 12 wherein said particle size is about 1/32 inch.

14. The process according to claim 9 including establishing the reduced space velocity such that the initial stage of said process is about equal in duration to the remainder of said stages.

15. The process according to claim 9 including operating said process in at least three space velocity stages.

16. The process according to claim 9 wherein the space velocity is decreased continuously after reaching said maximum temperature.

17. The process according to claim 9 including a LWHSV between 0.2 and 20.

18. A process for hydrodesulfurizing a sulfur- and metal-containing crude oil or residual oil comprising passing said oil and hydrogen over a bed of Group VI and Group VIII metal hydrodesulfurization catalyst, the catalyst cycle being limited by a maximum process constraint temperature, and operating said process at such reduced space velocity until a greater throughput is obtained upon reaching said constraint temperature than that which is possible with a higher space velocity and the same constraint temperature.

References Cited
UNITED STATES PATENTS 3,441,500　4/1969　Wunderlich _____ 208—216
3,546,105　12/1970　Jaffe _____ 208—216

PATRICK P. GARVIN, Primary Examiner

W. F. W. BELLAMY, Assistant Examiner

PO-1050
(5/69)

UNITED STATES PATENT OFFICE
CERTIFICATE OF CORRECTION

Patent No. 3,706,657  Dated December 19, 1972

Inventor(s) John A. Paraskos and Allen E. Somers

It is certified that error appears in the above-identified patent and that said Letters Patent are hereby corrected as shown below:

Column 7, Table III, Run No. 1, "799.5" should read --699.5-- .

Signed and sealed this 10th day of July 1973.

(SEAL)
Attest:

EDWARD M. FLETCHER, JR.
Attesting Officer

Rene Tegtmeyer
Acting Commissioner of Patents